United States Patent
Harvey et al.

(10) Patent No.: US 9,053,027 B1
(45) Date of Patent: Jun. 9, 2015

(54) TECHNIQUES FOR MAINTAINING AND RESTORING DIRTY CACHES ACROSS CPU RESETS

(75) Inventors: David Harvey, Newton, MA (US); H. Austin Spang, IV, Hopkinton, MA (US); Richard G. Chandler, West Hartford, CT (US); Hongliang Tang, Hopkinton, MA (US)

(73) Assignee: EMC Corporation, Hopkinton, MA (US)

(*) Notice: Subject to any disclaimer, the term of this patent is extended or adjusted under 35 U.S.C. 154(b) by 581 days.

(21) Appl. No.: 13/332,563

(22) Filed: Dec. 21, 2011

(51) Int. Cl.
*G06F 12/08* (2006.01)

(52) U.S. Cl.
CPC .................. *G06F 12/0804* (2013.01)

(58) Field of Classification Search
CPC .................................................. G06F 12/0804
USPC ............... 711/119, 120, 141–145; 714/16
See application file for complete search history.

(56) References Cited

U.S. PATENT DOCUMENTS

| | | | |
|---|---|---|---|
| 5,761,705 A * | 6/1998 | DeKoning et al. | 711/113 |
| 7,346,805 B1 * | 3/2008 | Scharland et al. | 714/6.31 |
| 7,441,081 B2 * | 10/2008 | Humlicek | 711/113 |
| 7,849,350 B2 | 12/2010 | French et al. | |
| 2004/0193950 A1 * | 9/2004 | Gagne et al. | 714/6 |

OTHER PUBLICATIONS

U.S. Appl. No. 13/077,553, filed Mar. 31, 2011, "Managing Enhanced Write Caching".

* cited by examiner

*Primary Examiner* — Aimee Li
*Assistant Examiner* — Gary W Cygiel
(74) *Attorney, Agent, or Firm* — Muirhead and Saturnelli, LLC

(57) ABSTRACT

Described are techniques for performing caching. Write operations of a single transactions are received. Write data of the write operations is cached in one or more cache pages of a first cache of a first storage processor. State information is set for the one or more cache pages of the first cache from an invalid state to a prepared state. The write data of the write operations is also stored in a second cache of a second storage processor. A transaction commit state for the single transaction is set indicating that transaction commitment processing for the first cache has commenced and is pending. State information of the one or more cache pages of the first cache is set from the prepared state to a dirty state. The transaction commit state for the single transaction is updated to indicate that the transaction commitment processing for the first cache is completed.

20 Claims, 10 Drawing Sheets

TECHNIQUES FOR MAINTAINING AND RESTORING DIRTY CACHES ACROSS CPU RESETS

BACKGROUND

1. Technical Field

This application relates to techniques used in connection with write caching.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

To facilitate uninterrupted operation of the host or server as it reads and writes data from and to the storage system, as well as executes application programs for use by users, the storage system may use a write cache that allows data from the server to be temporarily stored in the write cache prior to being written to a storage device. As such, the server can send data to the storage system and quickly be provided an acknowledgement that the storage system has stored the data. The acknowledgement is sent even though the storage system has only stored the data in the write cache and is waiting for an appropriate, convenient time to store the data on a physical storage device. As known in the art, storing data to a write cache is typically much faster than storing data directly to a physical storage devices such as disk drives. Consequently, the write cache buffers a large amount of data in anticipation of subsequently storing that data to a physical storage device.

One conventional data storage system includes two storage processors and an array of disk drives. Each storage processor includes, among other things, a local write cache. The local write caches mirror each other. Mirroring the cache protects data in the event of a storage processor failure.

During operation, the storage processors perform read and write operations on behalf of one or more external hosts. Since the contents of the local write caches are mirrored, the storage processors initially attend to write operations in a write-back manner. That is, the write policy of the storage processors involves acknowledging host write operations once the write data is stored in both write caches. By the time the external hosts receive such acknowledgement, the storage processors may not have yet evicted the write data from the write caches to the array of disk drives.

SUMMARY OF THE INVENTION

In accordance with one aspect of the invention is a method for performing caching comprising: receiving, at a data storage system, a set of one or more write operations comprising a single transaction, said set of one or more write operations writing data to one or more storage locations of one or more devices of the data storage system; caching write data of the one or more write operations in one or more cache pages of a first cache of a first storage processor, wherein each of the one or more write operations writes a portion of the write data to a storage location of a device having data stored in a cache page of the first cache and having state information indicating that the cache page includes invalid data for the storage location of the device prior to performing said each write operation; setting state information for the one or more cache pages of the first cache from an invalid state denoting said invalid data to a prepared state thereby indicating that, after performing said caching, the one or more cache pages include data for the one or more storage locations of the one or more devices used in committing the single transaction to the first cache; storing the write data of the one or more write operations in a second cache of a second storage processor; setting a transaction commit state for the single transaction, said transaction commit state indicating that transaction commitment processing for the first cache has commenced and is pending; setting state information of the one or more cache pages of the first cache from the prepared state to a dirty state for the one or more storage locations of the one or more storage devices thereby indicating that the one or more cache pages include a more recent copy of data than the one or more storage locations of the one or more devices; and setting the transaction commit state for the single transaction to indicate that the transaction commitment processing for the first cache is completed, The method may also include sending, from the first storage processor to the second storage processor, a set of state information for portions of the one or more cache pages associated with storage locations of storage devices written to by the one or more write operations, wherein said sending is performed prior to said step of setting state information of the one or more cache pages of the first cache. Each cache page may include a plurality of data portions, each of said plurality of data portions of said each cache page used to cache data for a range of addresses of a storage device. The second storage processor may set second storage processor state information indicating it has received and is processing the set of state information associated with the one or more write operations from the first storage processor. The second storage processor may update the second cache to include the set of state information. After completing updating of the second cache to include the set of state information received from the first storage processor, the second storage processor state information may be updated to indicate processing of the set of state information is completed. At least one of the one or more write operations may write a portion of the write data to a storage location of a device having data stored in two cache pages of the first cache. As a result of performing said caching, the write data may be stored in a first of the two cache pages having first state information indicating that the first cache page includes invalid data for the storage location of the device prior to performing said set of one or more write operations. The second of the two cache pages may have second state information indicating that the second cache page includes dirty data for the storage location of the device thereby indicating that, prior to performing said one or more write operations, the second cache page includes a more recent copy of data than the storage location of the device. Prior to setting the transaction commit state to indicate that the transaction commitment processing for the first cache is completed, the method may include setting the second state information of the second cache page for said at least one write operation from a dirty state, thereby indicating that the second cache page includes a more recent copy of data than the storage location of the device, to an invalid state, thereby indicating that the second cache page includes invalid data for the storage location of the device. The set of one or more write operations may include multiple write operations. At least a first of the multiple write operations may be to a first logical device at a first location and a second of the multiple write operations may be to a second logical device at a second location, the second logical device being different from the first logical device. The set of one or more write operations may include multiple write operations. At least a first of the multiple write operations may be to a first logical device in a first logical address range and a second of the multiple write operations may be to the first logical device in a second logical address range, the second logical address range and the first logical address range corresponding to different nonconsecutive logical address ranges of the first logical device. The first storage processor and the second storage processor may be included in a data storage system and each of the first storage processor and the second storage processor may perform write back caching in connection with processing said one or more write operations. The write data of the one or more write operations may be copied from by the first storage processor to the second storage processor by performing a direct memory access operation which copies data from first portions of the one or more pages of the first cache having associated state information indicating that the first cache is in the prepared state with respect to the first portions denoting that the first portions include data for the one or more storage locations of the one or more devices used in committing the single transaction to the first cache.

In accordance with another aspect of the invention is a computer readable medium comprising code stored thereon for performing caching comprising, the computer readable medium comprising code stored thereon for: receiving, at a data storage system, a set of one or more write operations comprising a single transaction, said set of one or more write operations writing data to one or more storage locations of one or more devices of the data storage system; caching write data of the one or more write operations in one or more cache pages of a first cache of a first storage processor, wherein each of the one or more write operations writes a portion of the write data to a storage location of a device having data stored in a cache page of the first cache and having state information indicating that the cache page includes invalid data for the storage location of the device prior to performing said each write operation; setting state information for the one or more cache pages of the first cache from an invalid state denoting said invalid data to a prepared state thereby indicating that, after performing said caching, the one or more cache pages include data for the one or more storage locations of the one or more devices used in committing the single transaction to the first cache; storing the write data of the one or more write operations in a second cache of a second storage processor; setting a transaction commit state for the single transaction, said transaction commit state indicating that transaction commitment processing for the first cache has commenced and is pending; setting state information of the one or more cache pages of the first cache from the prepared state to a dirty state for the one or more storage locations of the one or more storage devices thereby indicating that the one or more cache pages include a more recent copy of data than the one or more storage locations of the one or more devices; and setting the transaction commit state for the single transaction to indicate that the transaction commitment processing for the first cache is completed. The computer readable medium may further includes code for sending, from the first storage processor to the second storage processor, a set of state information for portions of the one or more cache pages associated with storage locations of storage devices written to by the one or more write operations, wherein said sending is performed prior to said step of setting state information of the one or more cache pages of the first cache. Each cache page may include a plurality of data portions, each of said plurality of data portions of said each cache page used to cache data for a range of addresses of a storage device. The second storage processor may set second storage processor state information indicating it has received and is processing the set of state information associated with the one or more write operations from the first storage processor. The second storage processor may update the second cache to include the set of state information. After completing updating of the second cache to include the set of state information received from the first storage processor, the second storage processor state information may be updated to indicate processing of the set of state information is completed. The set of one or more write operations may include multiple write operations. At least a first of the multiple write operations may be to a first logical device at a first location and a second of the multiple write operations may be to a second logical device at a second location, the second logical device being different from the first logical device. The set of one or more write operations may include multiple write operations, wherein at least a first of the multiple write operations may be to a first logical device in a first logical address range and a second of the multiple write operations may be to the first logical device in a second logical address range, the second logical address range and the first logical address range corresponding to different nonconsecutive logical address ranges of the first logical device.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
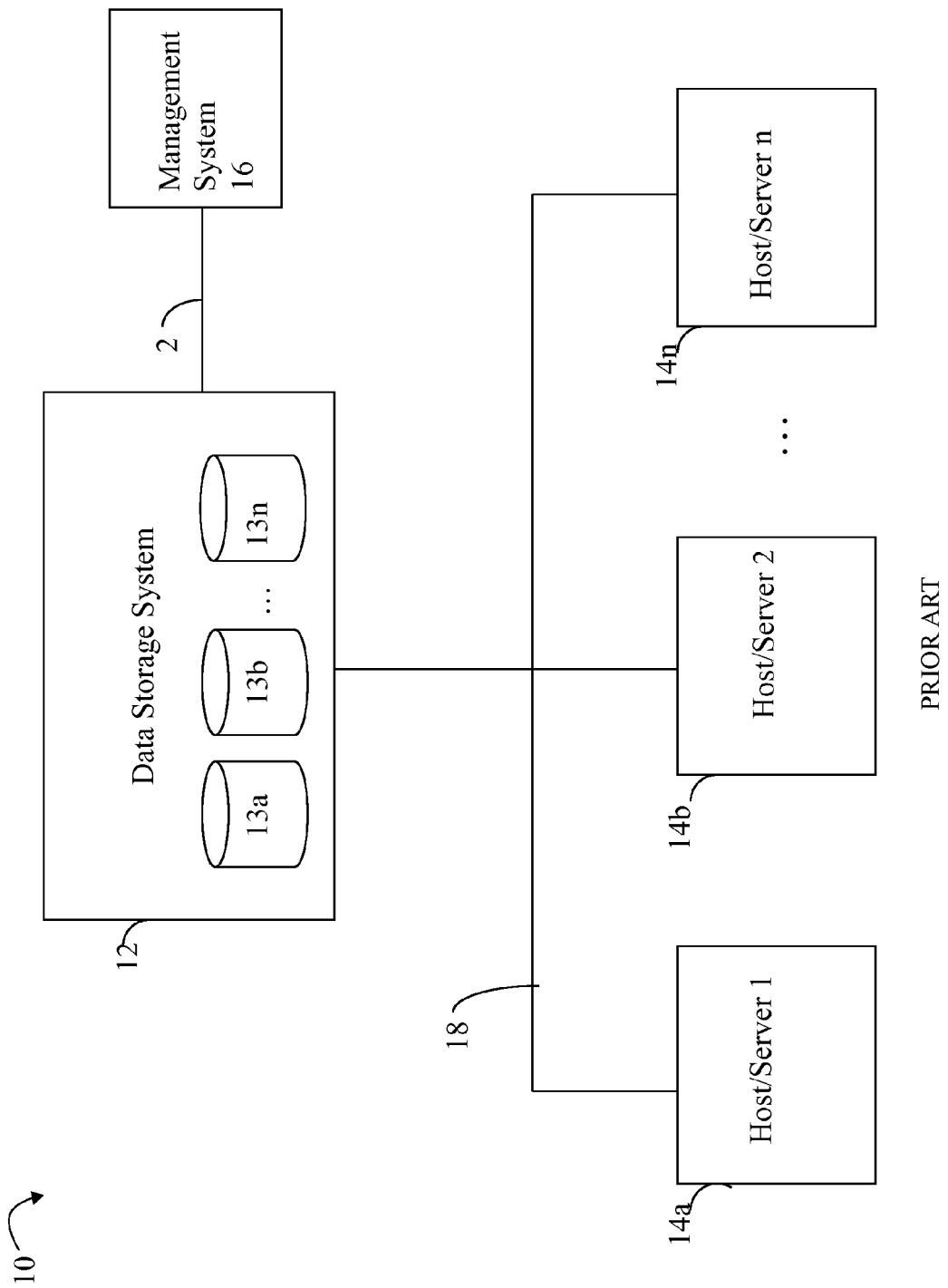
FIGS. 1 and 3 are examples of embodiments of systems that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2, In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
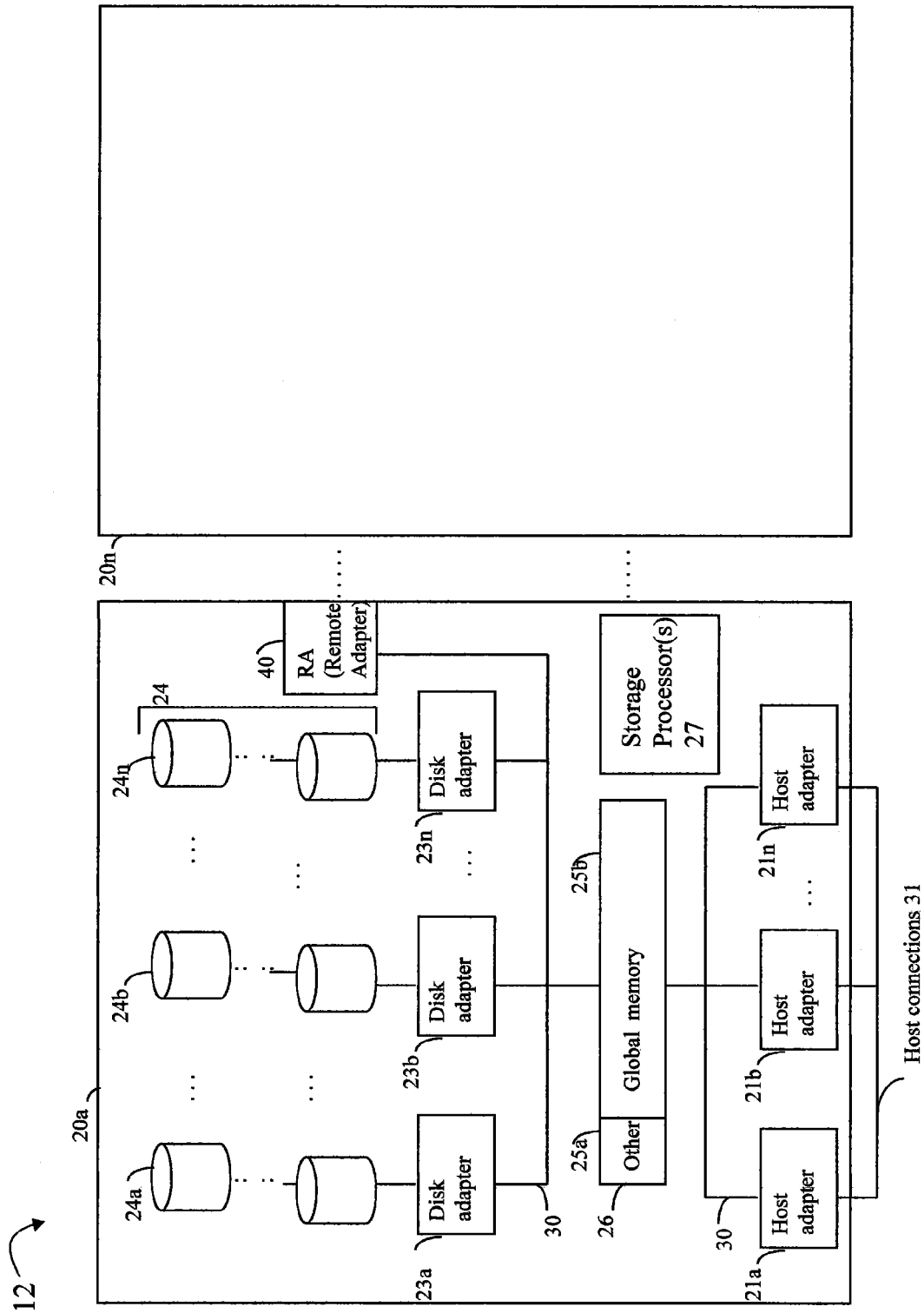
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Described below are techniques that may be used in connection with write cache management for maintaining and restoring caches across CPU resets. As described herein, a CPU reset is an operation that may be characterized as a software reset whereby the CPU stops executing at an instruction boundary and the memory (or selected portions thereof such as above or below a particular memory location/address) and the CPU's cache contents are preserved across the reset. Write operations performing updates to a cache in an embodiment performing write-back caching may be committed to the cache on a transactional basis. For example, a single transaction may include performing a set of one or more write operations from the host. Using techniques herein, changes to the cache of an SP due to the one or more write operations may be performed such that all such cache changes for the single transaction are committed (e.g., performed atomically) with respect to the SP's cache, or none of the cache updates to the SP's cache are performed for the transaction. Once the transaction has been committed with respect to an SP's cache thereby causing the SP's cache to be updated to reflect all the write operations of the transaction, the committed data is preserved across SP resets. Furthermore, as described in more detail below, in an embodiment including two SPs where a first of the SPs is unavailable (e.g., fails) and the remaining second SP commits to performing the transaction to its cache and then experiences a CPU reset, the transaction is committed having its data as stored in mirrored caches of both SPs preserved.

In general, for data integrity reasons a write I/O (a "write") from a host may be written to a respective newly allocated page in the write cache via direct memory access (DMA), and conventionally data movement is required for writes smaller than the page size as writes are committed as described below. In particular, conventionally when data is being transferred into part of a page in a cache, and the prior version of that page is dirty in the cache as explained below, the new data may not overwrite the old or existing data that may be currently stored in cache. Conventionally, a storage system allocated a new cache page when a write arrived, transferred the data into that new cache page, and then merged the pages into one page by copying data from the old page to the new page or vice versa depending which involved less copying of data. This conventional approach incurs the expense of processor time for copying the data from one page to the other. As described herein, an embodiment in accordance with techniques herein may defer performing such a merge of the two cache pages mapped to, and including data for, the same set of storage locations of a storage device where such cache pages may include write operation data used in connection with performing write-back caching. As known in the art, write-back caching stores write operation data initially in the cache where such data may be marked or denoted as "write-pending" data yet to be destaged to a physical storage device at a later point in time.

Figure 3:
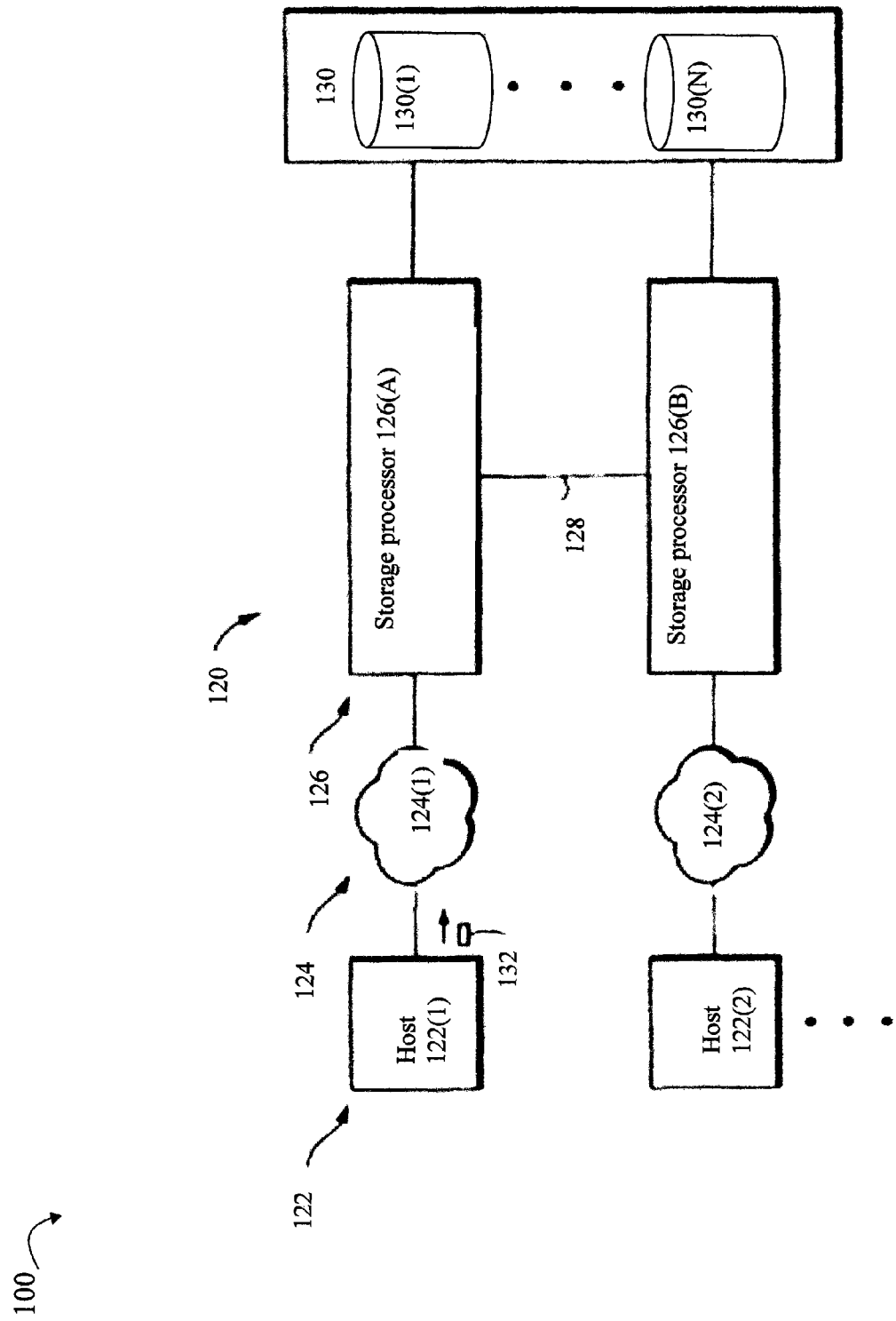

FIG. 3 is a block diagram of a data storage system 120 which is configured for write caching enhancement in accordance with techniques herein for use with a set of external host computers 122(1), 122(2), . . . (collectively, external hosts 122). The external hosts 122 connect to the data storage system 120 via a respective communications medium 124(1), 124(2), . . . (collectively, communications media 214).

The data storage system 120 includes multiple storage processors 126(A), 126(B) (collectively, storage processors 126), a cache mirror bus 128 and a set of disk drives 130(1), . . . 130(N) (collectively, disk drives 130). The storage processors 126 are configured to perform data storage operations (e.g., read operations, write operations, etc.) on behalf of the external hosts 122. The cache mirror bus 128 is configured to convey data between caches of the storage processors 126 thus enabling cache mirroring between the storage processors 126. The set of disk drives 130 enables the data storage system 120 to store and retrieve data on behalf of the external hosts 122 in a fault tolerant, non-volatile manner (e.g., using a RAID scheme). Each storage processor 126 is configured to perform write-back caching in response to write operations 132 from the external hosts 122 while both storage processors 126 are in operation. That is, each storage processor 126 acknowledges completion of a write operation 132 once the write data reaches its local write cache and, if possible, once the write data is mirrored in the local write cache of the other storage processor 126. Additionally, each storage processor 26 may be configured to continue to perform enhanced write-back caching. Such operation enables the data storage system 120 to provide improved response times.

Figure 4:
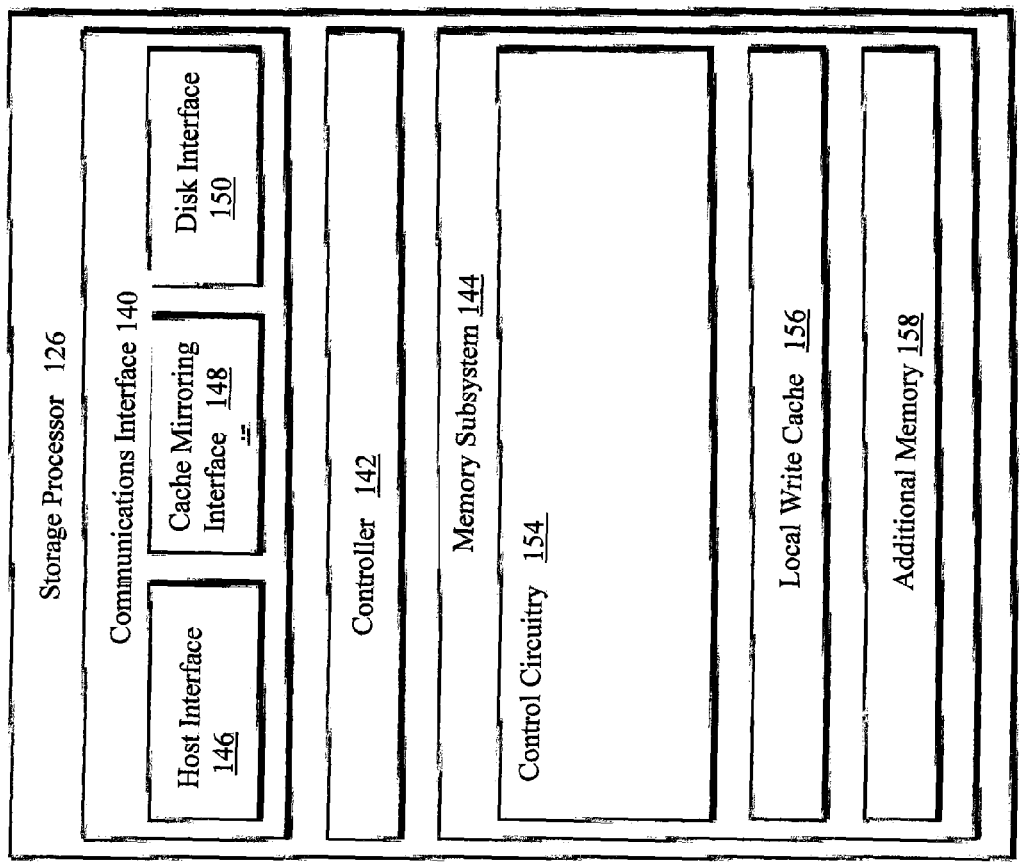
FIG. 4 is a more detailed diagram of components of a single storage processor in an embodiment in accordance with techniques herein.

FIG. 4 is a block diagram of each storage processor 126 of the data storage system 120. Each storage processor 126 includes a communications interface 140, a controller 142 and a memory subsystem 144. The communications interface 140 includes a host interface 146, a cache mirroring interface 148, and a disk interface 150. The memory subsystem 144 includes a control circuit 152, a local write cache 154 and additional memory 158. The additional memory 158 includes operating system storage, firmware for storing BIOS and POST code, optional flash memory, etc.

The communications interface 140 is configured to provide connectivity from the storage processor 126 to various other components. In particular, the host interface 146 is configured to connect the storage processor 126 to one or more external hosts 122 through the connection media 124 (also see FIG. 3). The cache mirroring interface 148 is configured to connect the storage processor 126 (e.g., the storage processor 126(A)) to another storage processor 126 (e.g., the storage processor 126(B)) to enable cache mirroring through the cache mirroring bus 128. The disk interface 150 is configured to connect the storage processor 126 to the set of disk drives 130.

The controller 142 is configured to carry out data storage operations on behalf of one or more of the external hosts 122 through the communications interface 140 (e.g., see the write operations 132 in FIG. 3). In some arrangements, the controller 142 is implemented as a set of processors running an operating system which is capable of being stored in a designated area on one or more of the disk drives 130. In other arrangements, the controller 142 is implemented as logic circuitry (e.g., Application Specific Integrated Circuitry, Field Programmable Gate Arrays, etc.), microprocessors or processor chip sets, analog circuitry, various combinations thereof, and so on.

The memory subsystem 144 is configured to provide memory services to the controller 142. In particular, the control circuitry 154 of the memory subsystem 144 is configured to perform processing of the techniques as described herein for use with the write cache 156 such as for transactional cache write commitments as described herein. The control circuit 154 is further capable of performing other tasks using the additional memory 158 (e.g., operating a read cache, operating as an instruction cache, optionally vaulting contents of the write cache 156 into non-volatile flash memory or disk drive memory in response to a failure of the controller 142, etc.).

The techniques described herein may be utilized in an embodiment which build on and incorporate techniques described, for example, in U.S. Pat. No. 7,849,350, (the '350 patent), RESPONDING TO A STORAGE PROCESSOR FAILURE WITH CONTINUED WRITE CACHING, Issued Dec. 7, 2010, to French et al., which is incorporated by reference herein, and U.S. patent application Ser. No. 13/077,553, (the '553 application) filed Mar. 31, 2011, MANAGING ENHANCED WRITE CACHING, Harvey et al., which is incorporated by reference herein.

In accordance with techniques herein, the memory used for storing data of the local write cache 156 may be characterized as persistent memory such as DRAM memory on an SP that is made more durable than other memory because it has its contents preserved across SP crashes and resets, so long as power is not lost, and software was able to flush the internal CPU cache to the persistent memory. Such persistent memory may have its contents preserved by the BIOS. Upon the occurrence of a primary power loss, the persistent memory such as may be used for the local write cache 156 may have its data stored (e.g., vaulted) on a form of non-volatile media while providing a backup power source (e.g., such as battery power) and copying the data to the non-volatile media. In accordance with techniques herein, software using persistent memory may be written based on the premise that write ordering of the write operations of a transaction are guaranteed. An embodiment using techniques herein allows for a set of write operations comprising the single transaction to be committed to a cache of an SP, such as cache 156, atomically. For example, as described in more detail elsewhere herein, processing may be performed whereby objects or structures for the transaction are prepared by placing them on a singly linked list, assigning a first pointer that points to the head of this list, storing the first pointer to the head of this list in persistent memory, traversing the list and performing an idempotent operation on each structure on the list, and finally setting the foregoing first pointer (e.g., copy of the head pointer) to NULL. If persistent memory is recovered such as upon the occurrence of a CPU soft reset, the foregoing first pointer will be examined, and if non-NULL, the foregoing processing will be repeated during recovery thereby allowing an update (i.e., write) represented by the set of structures of the singly linked list to be committed to cache on one SP atomically.

Also in accordance with techniques herein in an embodiment including two SPs, the contents of memory, including the local write cache 156 from one SP, may be mirrored on the other second SP so that the second SP may perform failover processing upon the failure of the first SP. Mirrored memory has a copy of the data and associated control structures stored in persistent memory on each of two SPs. When a cache update occurs, and processing is performed to transactionally commit one or more write operations for that transaction to persistent memory on one SP, the techniques herein also provide for transactionally committing those one or more write operations to persistent memory on the other SP. In connection with the foregoing, the intent is to ensure, for example, that partial cache updates for less than all of the write operations of the transaction are impermissible in the presence of no faults or a single SP faults. In connection with techniques herein, a write is not directly made to overwrite data of a cache location containing dirty data without first writing such data to a new cache location. Accordingly, when copying data from a first cache of one SP to another cache of a second SP such as by using DMAs to provide cache mirroring of the two SPs, the DMA engine also abides by such a rule and that the DMA does not initially store the cached data in the second SP's cache at a location containing valid data. Rather, the data may be initially copied to cache locations of the second SP having associated state information indicating that the cache locations contain invalid data. At a second point in time, cache state information of the second SP may be updated to indicate that the cache locations contain usable dirty data. Thus, it is the copying of this state information to the second target SP that causes the actual cached data of the second SP to be recognized as usable. Also, a persistent memory transaction on the second SP may be used to commit the received data atomically. The client (e.g., such as the host sending the one or more write operations comprising the transaction) is sent an acknowledgment that the transaction is complete or committed only after the local persistent memory transaction has completed on the first SP and after the second SP has committed the transaction.

In accordance with techniques herein, the data storage system may receive the write operations of the transaction and may include hardware which allows DMA operations to write to both memories of both SPs simultaneously. The coherence of mirrored memory between the two SPs may be accomplished via software message passing using an inter-processor bus between the two SPs. In accordance with techniques herein, memory that is both persistent and mirrored such as on two SPs has the property that it will not lose data stored in such memories upon the occurrence of a power failure (e.g., assuming there is sufficient backup power for any vaulting to non-volatile storage or the memory is made of a non-volatile memory technology), upon the occurrence of any single SP failure (hardware or software), and upon the occurrence of both SPs experiencing a software or CPU reset (e.g., such as may occur when an operating system crashes on each SP).

Described in following paragraphs are techniques that may be used in an embodiment with two SPs. However, it will be appreciated by those skilled in the art that techniques herein may also be performed in embodiments having more than two SPs. Having such dual SPs with mirrored caching provides for fault tolerance whereby the same cache contents are mirrored in both SPs and upon a failure of one SP, the other non-failing SP can take over processing using its mirrored cache. Additionally, if one SP fails, an embodiment in accordance with techniques herein may also tolerate a CPU reset or software reset of the remaining non-failing SP whereby the remaining SP experiencing the software reset has control transferred to its BIOS (e.g., such as when the operating system crashes or other type of software failure causing transfer of control to the BIOS) and the contents of the cache and memory are preserved. In such cases in an embodiment in accordance with techniques herein, the non-failing SP may perform recovery processing that is able to complete all write operations of a committed transaction thereby providing atomicity of such write operations and cached data at a transactional level. Additionally, in accordance with techniques herein, such transactional updates may be characterized as such on two levels—first with respect to persistent memory and cache of a first SP which can tolerate a software reset and also with respect to mirrored SPs (e.g., in order to tolerate failure or unavailability of a single SP for any reason).

Figure 5:
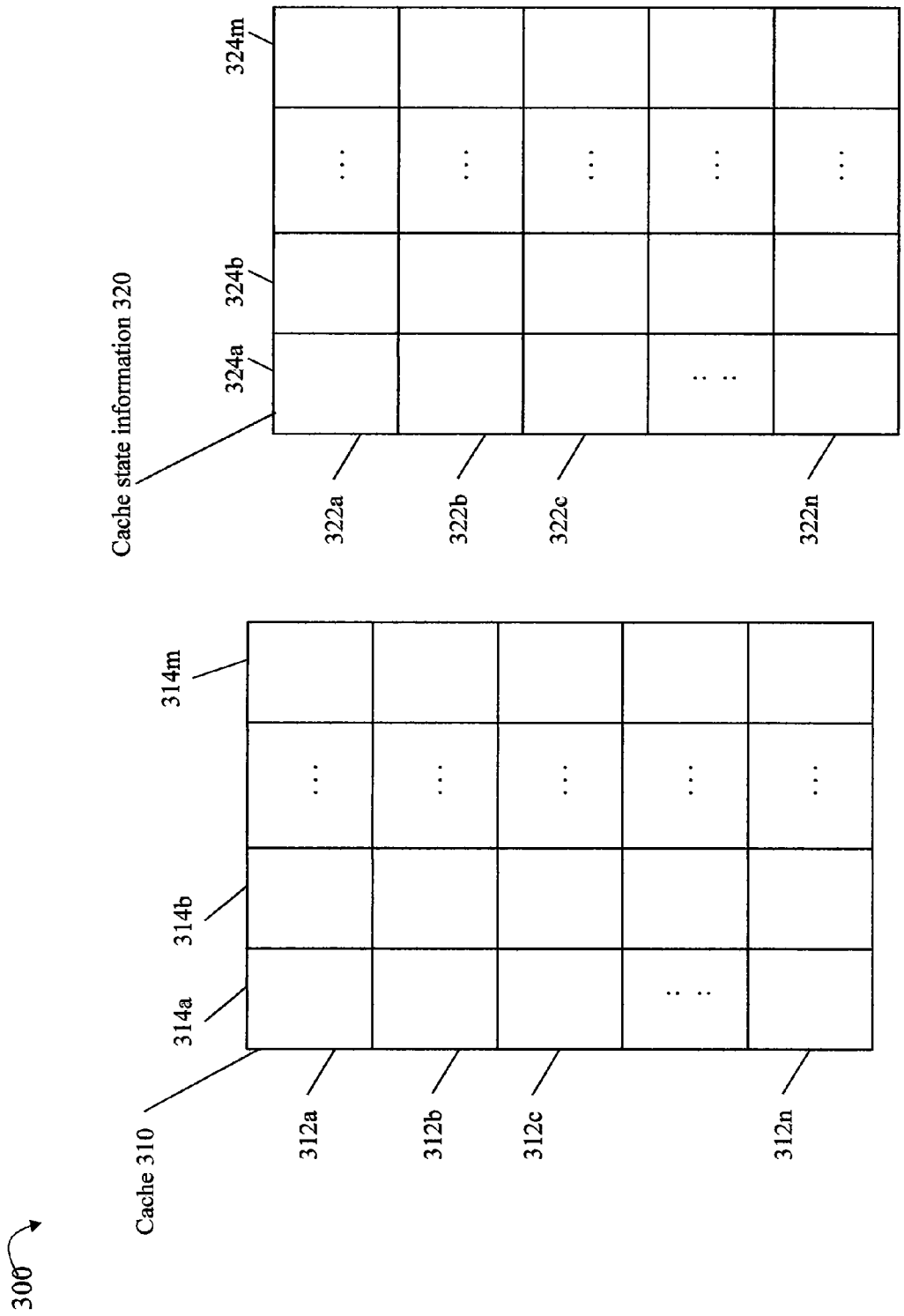
FIG. 5 is an example illustration of a cache and cache state information that may be used in an embodiment in accordance with techniques herein.

Referring to FIG. 5, shown is an example illustrating a cache and associated cache state information that may be used in an embodiment in accordance with techniques herein. The example 300 includes cache 310 and associated cache state information 320. The cache 310 is an example illustrating cache pages 312*a*-312*n* as may be included in each of the SPs as described in connection with other figures herein. The cache 310 may include any number of "n" cache pages 312*a*-312*n* where each such cache page may be further partitioned into one or more "m" subpages denoted 314*a*-314*m*. In one embodiment, each subpage may correspond to a sector of a storage device and may be able to cache data for the corresponding sector therein. More generally, each subpage of a cache page may correspond to any portion of a storage device having a subrange of addresses of the storage device. For example, in one embodiment the storage device may be a LUN having a total capacity with an LBA (logical block address) range. Each sector or portion of the LUN as stored in a subpage of cache may have an associated subrange of LBA addresses for the LUN representing the portion of the LUN having data stored in the subpage of cache. Cache state information 320 may be stored for each cache page. Furthermore, an embodiment may store cache state information at the subpage level such as for each of the "m" subpages of a single cache page. The cache state information 320 illustrates maintaining cache state information 322*a*-322*n*, respectively, for each cache page 312*a*-312*n*. Additionally, for each row of cache state information 322*a*-322*n*, element 320 illustrates maintaining cache state information 324-324*m*, respectively, for each subpage 314*a*-314*m* thereof.

In connection with techniques herein, the cache state information 320 for each subpage of cache may include a pair of status bits indicating that the cache subpage includes cached data in one of four states—VALID, DIRTY, INVALID and PREPARED—with respect to a portion of a physical device denoted as having its data cached in the subpage:

VALID (also denoted using V in subsequent description and figures)—indicating that the cache and the physical storage device contain the same current copy of the data. The subpage having the valid state may also be characterized as having valid cached data for the portion of the storage device.

DIRTY (also denoted using D in subsequent description and figures)—indicating that the cache has the more recent or current copy of the data rather than the physical storage device. This may be the case where such cached data of the subpage is write pending and has yet to be destaged to the physical storage device. The subpage having the dirty state may also be characterized as having dirty cached data for the portion of the storage device.

INVALID (also denoted using I in subsequent description and figures)—indicating that the cached copy of data is invalid or out of date and not the most recent or current copy of the data. The subpage having the valid state may also be characterized as having invalid cached data for the portion of the storage device.

PREPARED (also denoted using P in subsequent description and figures)—indicating a transient state related to a transaction of one or more write operations described and used in connection with techniques herein below. The prepared state may be set to denote that the cached subpage includes cached data needed and used in connection with performing a transactional commit operation as described herein to commit data of a transaction to the cache of a single SP and subsequently to the mirrored cache of the second SP.

An embodiment may also maintain and utilize other cache state information 320 for each subpage and/or cache page than as described herein. The cache state information 320 may be stored physically in storage locations which may or may not be contiguous with respect to the cached data of 310. For example, cache state information for a sector may or may not be stored contiguously with respect to the cached data for the sector. Furthermore, it may be desirable to store portions of the cache state information 320 collectively in the aggregate in the same physical storage area. For example, an embodiment may store the status bits for each cache page in the aggregate in a single storage area in order to facilitate access and performing processing on sets of multiple status bits across multiple cache pages. An embodiment may use any one of a variety of different suitable data structures and techniques to implement the cache and management thereof. Furthermore, an embodiment may utilize any suitable technique to represent the mapping or association of one or more cache subpages or pages to a particular portion of a storage device thereby indicating that the cache subpages or pages are used to cache data for the same storage device locations.

In accordance with techniques herein, data for a write operation directed to a storage device location may not be written to a cache location containing "dirty" data for that storage device location. For example, the write operation may write new data to a sector of a storage device. Currently existing data for the sector of the storage device may be stored in cache at a subpage having associated state information indicating that the subpage contains data in a dirty state as described above. This may occur, for example, where data for a previous write operation to the sector is still in cache and has not yet been destaged to the physical storage device. In this case, the new write data is not written into the existing first subpage for data integrity reasons (e.g., such as related to the possible outcome of the subpage contents if the write to cache is aborted, incomplete, and the like). Rather, a second cache page is allocated and a subpage thereof is also associated with the same storage device locations as the first subpage. Assuming the two cache pages each contain subpages that map to the same storage device locations (e.g., subpage 1 of each cache page stores cached data for the same first address range of the same first storage device, subpage 2 of each cache page stores cached data for the same second address range of the same second storage device, and the like), the data storage system may perform processing to merge the two cache pages mapped to the same storage device locations whereby the new write data stored in the second cache page and existing first cache page data are merged into a single cache page of cached data such as by copying data from the first old page to the new cache page, or vice versa depending on which involved less data copying. Subsequently, the cache state information for the resulting merged cache page may be updated including setting the status bits for subpages containing the newly written data to DIRTY and additionally freeing the unused cache page. In some embodiments using techniques herein, the data storage system may not merge the foregoing two cache pages and may rather defer such cache page merging. Cache page merging is described in more detail in the '553 application. In connection with techniques herein, it is should therefore be noted that the same portion of a storage device may be mapped to none, one or two cache pages (e.g., two cache pages may both include cached data for the same sector of the same storage device having the same LBA range or portion of the entire LBA range for a LUN). Furthermore, in connection with deferred page merging in which there are two cache pages mapped to the same storage device locations, if a first cache page contains dirty cached data for a first storage device location (e.g. has state=dirty), the second cache page containing data for the same first storage device location contains invalid cached data for the first storage device location (e.g., has state=invalid). In such cases, subsequently received new write data for the first device storage location may be written to the cache page currently containing invalid data for the first device storage location.

Figure 6:
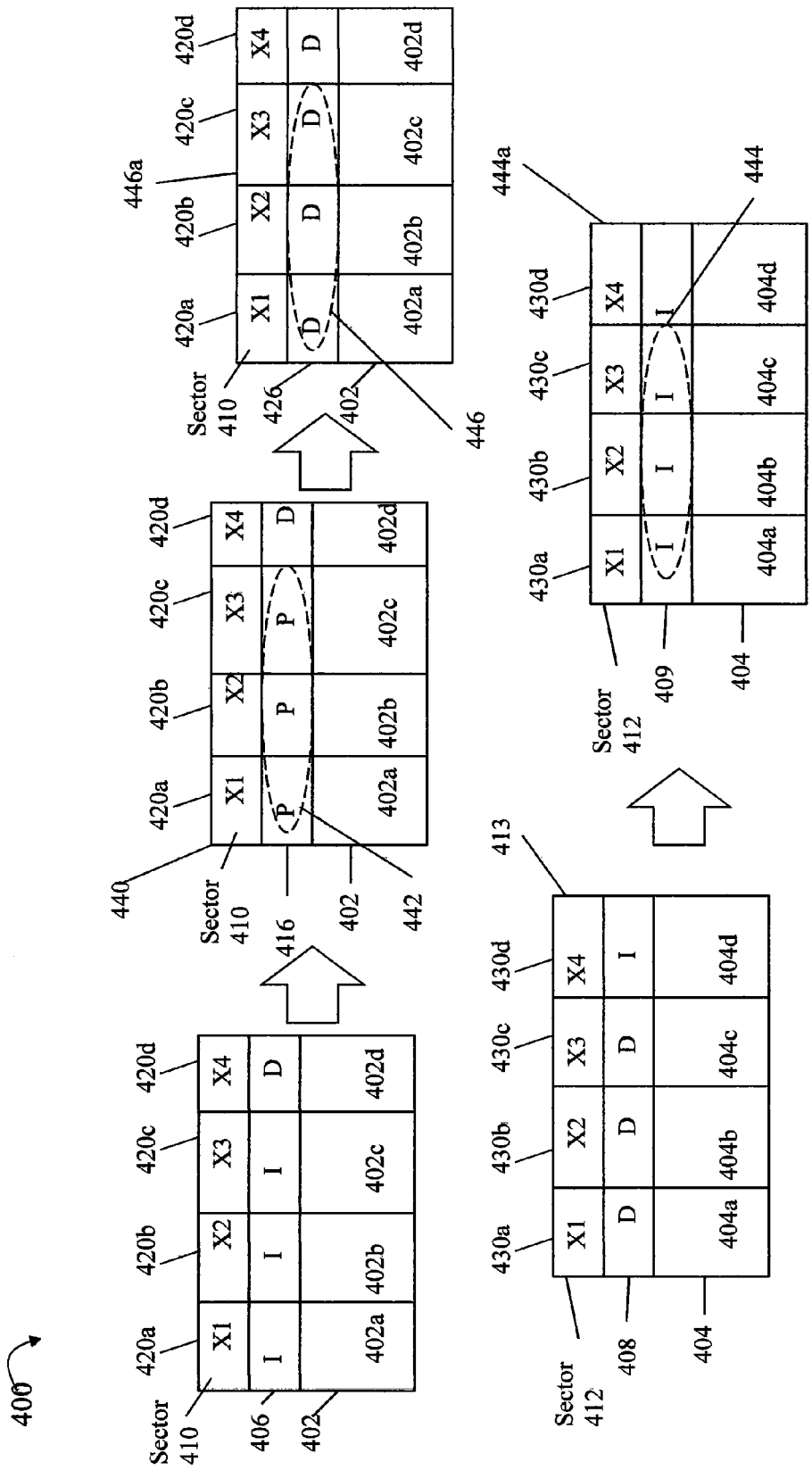
FIG. 6 is an example illustrating various state transitions for sector state information as may be performed in an embodiment in accordance with techniques herein.

Referring now to FIG. 6, shown is an example of two cache pages that may map to the same storage device locations in an embodiment in accordance with techniques herein using deferred cache page merging. The example 400 includes a first cache page 402 used to cache data for four sectors of a storage device and a second cache page 404 used to cache data for the same four storage device sectors. The four sectors are denoted as X1, X2, X3 and X4 in 410 and 412. Cache page 402 includes cache subpages 402a-402d mapped (e.g., used to cache data for), respectively, sectors X1, X2, X3 and X4. Element 406 is a row or vector of state information for the cache subpages of 402. The row of state information 406 includes an entry for each of the sectors of 410. Each of the columns 420a-420d denote a sector of 410, subpage of 402 and element of state information of 406 indicating that the subpage is used to cache data of the sector and is currently in the state represented by the element of state information. Cache page 404 includes cache subpages 404a-404d mapped (e.g., used to cache data for), respectively, to sectors X1, X2, X3 and X4. Element 408 is a row or vector of state information for the cache subpages of 404. The row of state information 408 includes an entry for each of the sectors of 412. Each of the columns 430a-430d denote a sector of 411, subpage of 404 and element of state information of 408 indicating that the subpage is used to cache data of the sector and is currently in the state represented by the element of state information.

The cache pages 402 and 404 may have the cached data and state information of the example 400 as the result of performing a series of write operations of which one example will now be described. At a first point in time, a first write operation from a host may write data to sectors X1-X4 resulting in allocation and use of the cache page 402 whereby the sectors X1-X4 respectively have corresponding state information={D, D, D, D} (e.g., D denoting the Dirty state). At a second point in time, the data storage system may receive additional writes to sectors X1-X3 resulting in allocation and use of cache page 404. The additional cache page 404 is allocated in accordance with the premise that new write data for X1-X3 is not directly written into cache page 402 because it contains dirty data for sectors X1-X3. Thus, the cache page 404 is allocated and the write data from the second point in time is stored in 404a-404c. The state information associated with each of 402a-402c is updated to I (e.g., I denoting the Invalid state) since the latest data for sectors X1-X3 is now stored in 404a-404c. The state information associated with each of 404a-404c may be updated to D since the latest data for sectors X1-X3 is now stored in 404a-404c. State information for 404d may be denoted as I since 404d contains invalid data with respect to sector X4. Thus, as a result of above-mentioned writes, the cache pages and associated state information may be as illustrated in the example 400. For purposes of this example, assume that the above-mentioned writes were each independently issued and not denoted as being included in a transaction such as one including multiple write operations to multiple sectors. Also, assume that a first cache of a first SP, denoted SP A and a second cache, denoted SP B, are mirrored so that both the first and second caches include the same data and state information as just described. SP A may be characterized as the controlling SP in connection with the techniques described in following paragraphs for performing transactional updates to the mirrored caches.

At this point, the data storage system may now receive a set of write operations comprising a single transaction that writes to sectors X1, X2 and X3. A determination is made as to whether to store the new write data for the set of write operations in portions of cache page 402 or 404 of SP A. In connection with techniques herein, the cache page or subpage used to cache new write data may be that cache page or subpage including invalid data for the sectors X1, X2 and X3. In this example, cache subpages 402a, 402b and 402c are used as the target cache subpages to hold the new write data in the cache of SP A.

As a next step in accordance with techniques herein, the cache state information for subpages 402a, 402b and 402c of SP A are all updated from I (e.g., the Invalid state) to denote a transition to the Prepared (P) state as represented by element 440. Element 442 denotes the state transition from I to P for subpages 402a-402c of SP A. As described herein, the write data may also be sent via data storage system hardware to both SP A and SP B simultaneously. In this case, SP B may also store the new write data to in its cache to mirror that of SP A. As described elsewhere herein as a general rule and also in connection with SP A's cache, data is stored in SP B's cache in cache pages designated as used for caching data of the appropriate sectors and not having a dirty state. If the data storage system hardware does not provide support for such simultaneous transmission to both SP A and SP B or the hardware has failed to successfully provide SP B with the new write data, SP A may perform DMA operations to transfer the new write data into SP B's cache to mirror the cache locations of SP A. It should be noted that SP A may also use any other suitable technique known to those of ordinary skill in the art rather than the DMA operations to perform such data transfer.

SP A now performs processing to mark the start of the commit operation for the transaction. In connection with denoting this state of commit start for the transaction, reference is made to FIG. 7. The example 500 includes structures that may be used in connection with techniques herein to commit the transaction's data across multiple cache pages of SP A and SP B. The example 500 includes a list of structures where the head or first structure of the list is denoted by head pointer 502. This example includes a list of only two entries or structures 522, 524 for simplicity of illustration. Entry 522 is a structure identifying cached data for this transaction for a sector corresponding to LUN X 506 having an LBA subrange or portion identified by 508 having its data stored in cache pages denoted by the cache page list 510. The cache page list 510 may identify the cache pages used to store data for the sector denoted by information of 506 and 508. The cache page list 510 is illustrated as including two cache pages 512 and 514. More generally, the cache page list for a sector may include zero, one or two entries in an embodiment in accordance with techniques herein. The list 510 may be a linked list of cache pages used to store data for the sector denoted by 506, 508 so that 510 identifies a first entry 512 denoting the first cache page 512a. Additionally, entry 512 may include a next pointer field 512b which points to the next cache page entry 514 in the list. Entry 514 includes information similar to that of entry 512 and has its next pointer 514b set to NULL denoting no next element in the cache page list 510. Structure 522 includes a next field 516 which points to the next structure or entry 524 in the structure list corresponding to a sector having data stored in cache to be committed as part of this transaction. An embodiment may include a separate instance of head pointer 502 and linked list of structures for each transaction being committed. The head pointer 502 and linked list of structures 522, 524 for each transaction may be stored in persistent memory and therefore are available after a CPU reset. Structure 524 contains information similar to that as described herein for structure 522 with the difference that structure 524 denotes a different sector having cached data that is involved in this transaction. For example, structure 524 may denote a sector of a different LUN (e.g., LUN Y) and/or different LBA subrange in comparison to that as denoted by structure 522.

In connection with marking the start of the commit operation for the transaction, a commit pointer 504 may be assigned to point to head pointer 502. The list of structures identified by head pointer 502 may be traversed to set the pending commit (PC) state for each structure or entry on the list from 0 to 1 thereby denoting that the commit operation as started. In this example, structure 522 has its PC state bit 518 set from 0 to 1, and structure 524 has its PC state bit 538 set from 0 to 1. Once the PC state bits 518, 538 of all entries in the list have been set to 1, the commit pointer 504 may be unlinked or disconnected from head pointer 502 such as by assigning pointer 504 to NULL. It should be noted that commit pointer 504 is also stored in persistent memory so as to be available upon the occurrence of a CPU reset in a manner similar to the list of structures identified by the head pointer 502 and structures 522 and 524.

If a CPU reset occurs and there is a commit pointer 504 set, recovery processing may resume with traversing the list of structures headed by head pointer 502 as described above.

With reference back to FIG. 6, processing is performed on SP A to update state information for cache pages 404 and 402. Cache page 402 has its state information updated from the state denoted by table 440 to the state denoted by table 446a. In particular, element 446 indicates that state information of table 446a for sectors X1, X2 and X3 is updated from P (prepared) to D (dirty). Cache page 404 has its state information updated from the state denoted by table 413 to the state denoted by table 444a. In particular, element 444 indicates that state information of table 444a for sectors X1, X2 and X3 is updated from D (dirty) to I (invalid).

Figure 7:
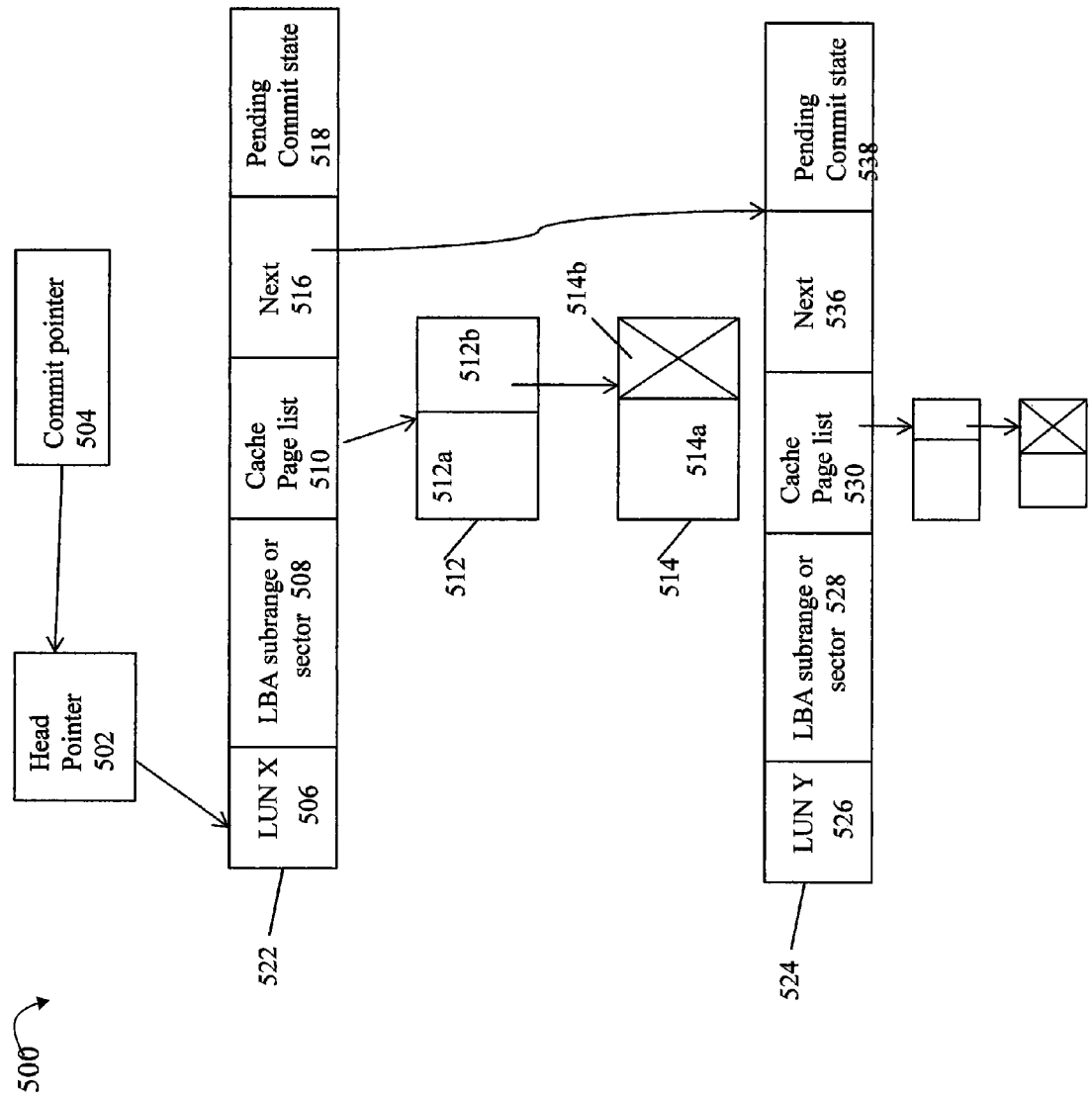
FIG. 7 is an example illustrating data structures that may be used in an embodiment in accordance with techniques herein.

It should be noted that a sector having a structure on the list of FIG. 7 may have only a single cache page whereby there would be no second cache page such as 404 of FIG. 6 and no need to update state information as described above in connection with tables 413 and 444a.

After SP A has updated its state information as described above, SP A may then clear its commit mark thereby indicating the commit processing for the current transaction with respect to its cache has completed. In the embodiment described herein with reference to FIG. 7, this transactional state completion with respect to SP A's cache may be denoted by traversing the list of structures having a first entry or structure identified by head pointer 502 and setting each structure's pending commit state (PC) field to 0 (zero) thereby indicating the pending commit has completed. In this example, the foregoing results in setting each of 518 and 538 to 0 (zero).

SP A forms an interprocessor message to be sent to SP B where the message includes state information of SP A for those cache pages and/or subpages used to store data for the transaction being processed. In this example with reference to FIG. 7, the state information is for those cache pages or subpages included on the cache page list of each structure denoting a sector for this transaction. In particular for this example, the state information for the caches included on lists 510 and 530 may be included in the message sent from SP A to SP B.

Figure 8:
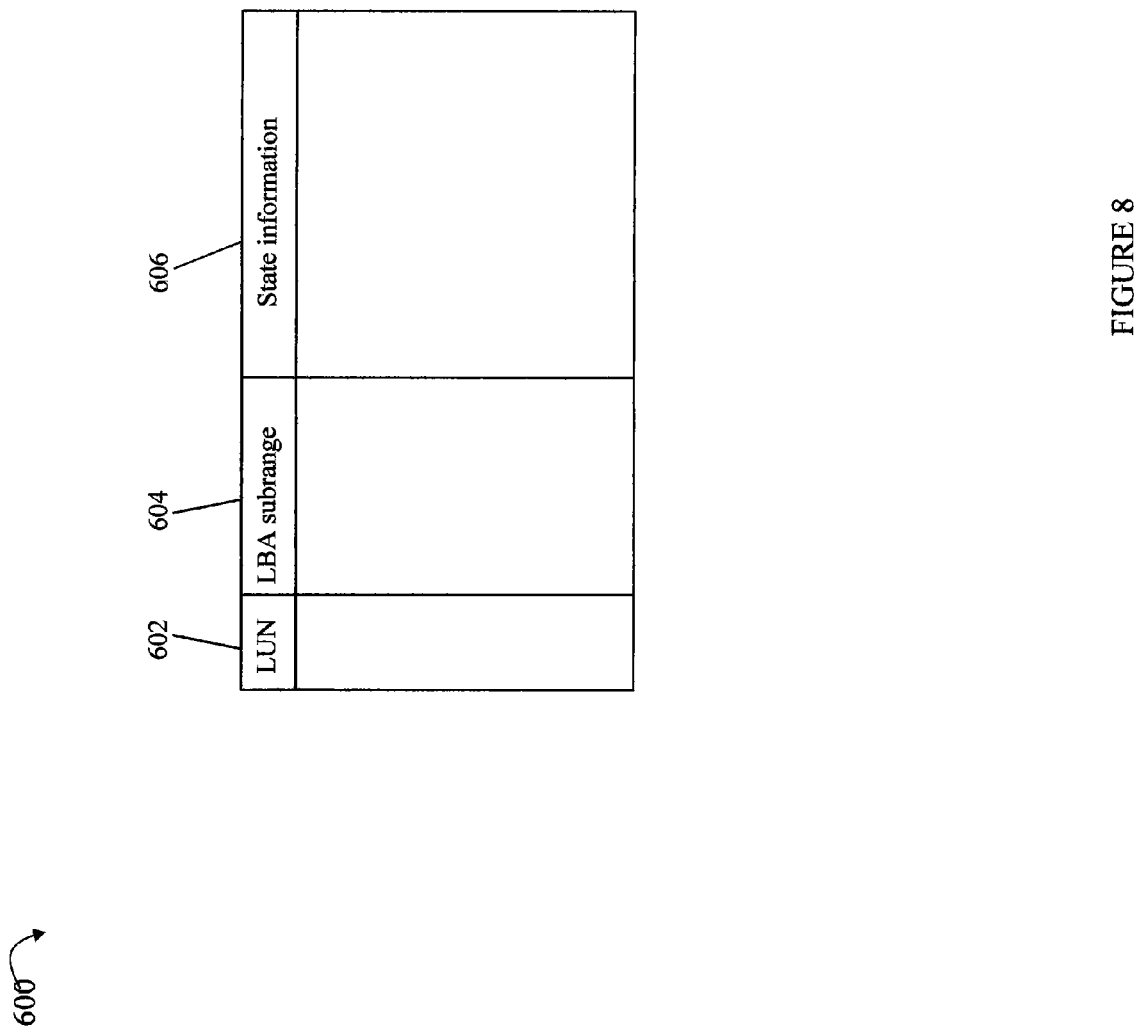
FIG. 8 is an example illustrating information that may be included in an interprocessor message communicating sector state information updates for a transaction in an embodiment in accordance with techniques herein.

Referring to FIG. 8, shown is an example 600 representing information that may be included in the interprocessor message from SP A to SP B in an embodiment in accordance with techniques herein. The message of the example 600 may include state information for each sector as represented by a row in the message denoting the LUN 602, corresponding LBA subrange or sector 604 of the LUN, and state information 606 for the sector.

SP B receives the interprocessor message including the state information for the cache pages of the transaction and accordingly updates its state information for the cache pages. It should be noted that SP B does not use the new write data of the transaction as already stored in its cache pages until SP B receives the updated sector state information from SP A thereby indicating the new write data stored in cache as having a revised corresponding state of dirty. In other words, until the sector state information on SP B is updated for the new write data of the current transaction using the interprocessor message from SP A, sector state information corresponding to such write data on SP B is indicated as invalid (e.g., as if the writes of the transaction had not occurred from SP B's point of view since the new write data of the transaction is otherwise in cache locations denoted as invalid).

When SP B receives the interprocessor message containing the state information for the transaction, SP B sets an indicator in its persistent memory that it has received the message and is servicing or processing the state information of the message. After SP B has updated its cache state information based on the received interprocessor message from SP A, SP B may clear the indicator to now indicate it has completed processing of the state information in the message. Setting and clearing such an indicator allows SP B to perform recovery processing as may be needed if SP B should have a CPU reset prior to completing the update to its cache state information. In this case, the indicator of SP B indicates that such state information processing of the received message from SP A has not been completed and SP B may perform such processing as part of its recovery operation.

It should be noted that if SP A has failed and the message has not yet been transferred to SP B, SP A may recover and then send the message since the information used to form the message is persistently stored on SP A. If SP A has failed and SP B has received the message, SP B is able to handle subsequent processing using the updated write data of the transaction. It should be noted that if SP A fails (e.g., prior to notifying the host that the write operation has been committed) and SP B remains running and has received the message from SP A, the write that SP A was attempting is discarded if B is not able to complete commitment of the write operation (e.g., completing end commit mark processing such as by clearing all PC states of entries in the list of 502).

It should also be noted that an embodiment may set or update the state information for cache pages such as on SP B in any one of a variety of different ways that may vary with embodiment and how such state information may be stored. For example, an embodiment may update state information serially (e.g., individually) for each sector's LBA range of the transaction. Alternatively, an embodiment may store state information for multiple pages as an aggregated unit (e.g., a bit vector including only pairs of status bits for sectors in multiple pages) and perform bit vector updates as a single operation to thereby set/update all bits of the vector as a group. In other words, rather than perform the separate writes to update each individual set of sector state information sequentially, an embodiment may perform an optimization to determine the appropriate resulting sector state bit values for multiple sets of sector state information (e.g., for multiple LBA ranges) such as using vector math and then write or update the sector state information for the multiple sets with a single update operation.

With reference back to FIG. 6, an example was presented for a case where there are two cache pages containing data for the same set of storage locations. It may be that a single cache page contains data for the set of storage locations rather than two such pages. This may be the case, for example, where new write data is for a sector that is mapped to a single cache page including either valid (V) or invalid (I) data for sector. In this case, the new write data may be written into the single cache page and the cache page state information may then be updated to indicate state D or that the page contains dirty data for the sector. As described above with reference to FIG. 6, the sector state information of SP A for cached data for writes of the transaction have their state information updated from I to P (e.g., see element 442 of table 440). This step may be generalized to the case where the existing or current state for cached sectors of SP A may be either V (valid) or I (invalid) and therefore in either of these cases the state information is updated to state P.

In connection with the foregoing description, if a CPU reset is received at any point in time on SP A, there is sufficient information persistently stored for SP A to complete the transaction subsequent to the reset. What will now be described is more detail regarding recovery processing as may be performed in an embodiment in accordance with techniques herein considering various points in time at which a CPU reset may occur. In connection with following discussion, reference may be made to elements of previous FIGS. 6 and 7.

A CPU reset may occur before the commit pointer 504 has been set. In this case, the transaction is discarded.

A CPU reset may also occur after the commit pointer is set and while the commit pointer is still set. If a CPU reset occurs while the commit pointer 504 is set, recovery processing may resume with traversing the list of structures headed by head pointer 502 as noted above.

Additionally, the list of structures headed by 502 is traversed to ensure that the PC states for all structures in the list are set (=1) and the commit pointer 504 is then set to null. The list of structures is then traversed such that for all structures in the list headed by 502 having the PC state=1, sector state information is updated whereby current states of D are updated to I(if there is a corresponding sector in state P), current states of V are updated to I(if there is a corresponding sector in state P), and current states of P are updated to D. For all messages that arrived but have not been completed, the message is replayed.

A CPU reset may occur after the commit point has been cleared but while the PC states of structures in the list headed by 502 are set. In this case, for each structure having PC=1, processing performed is then similar to as described above where sector state information is updated (e.g., current states of D are updated to I (if there is a corresponding sector in state P), current states of V are updated to I (if there is a corresponding sector in state P), and current states of P are updated to D) and then for all messages that arrived but have not been completed, the message is replayed.

A CPU reset may occur after PC states of structures in the list headed by 502 are clear (=0) but prior to having a message sent and received by the other SP with the updated state information. In this case, if the other SP remains running (operational and healthy), the current transaction of the failing SP (e.g., having the CPU reset) is discarded along with all of the failing SP's state information and the other SP's state information is used to resume processing for the failing SP. If the other second SP also fails, the current SP's state is coherent and is used. If both SPs have CPU resets, on reboot of the system a selection is made regarding which SP's state information is used.

A CPU reset on a first SP may occur after the message with state information has been received by the second SP and is marked as having been received by the other SP. In this case, if the receiving second SP remains running, the receiving second SP completes the transaction. If the receiving second SP has a CPU reset and the sending first SP remains running, the second receiving SP's state information is discarded and the first SP's state information is used. If both the first and second SPs have CPU resets, the receiving second SP will resume processing on recovery using the received message and state information and have a consistent state. If both SPs have consistent state information, processing may be performed to select one of the SP's whose state information is used in connection with resuming processing.

It may be desirable to use techniques herein for performing a transactional commit operation for a series of write operations in a variety of different situations. For example, a single database transaction may include multiple writes to the same or different LUNs at various locations and it may be desirable to atomically commit data for such writes to SP A's cache and also in connection with subsequently updating SP B's cache to mirror that of SP A's cache.

Figure 9:
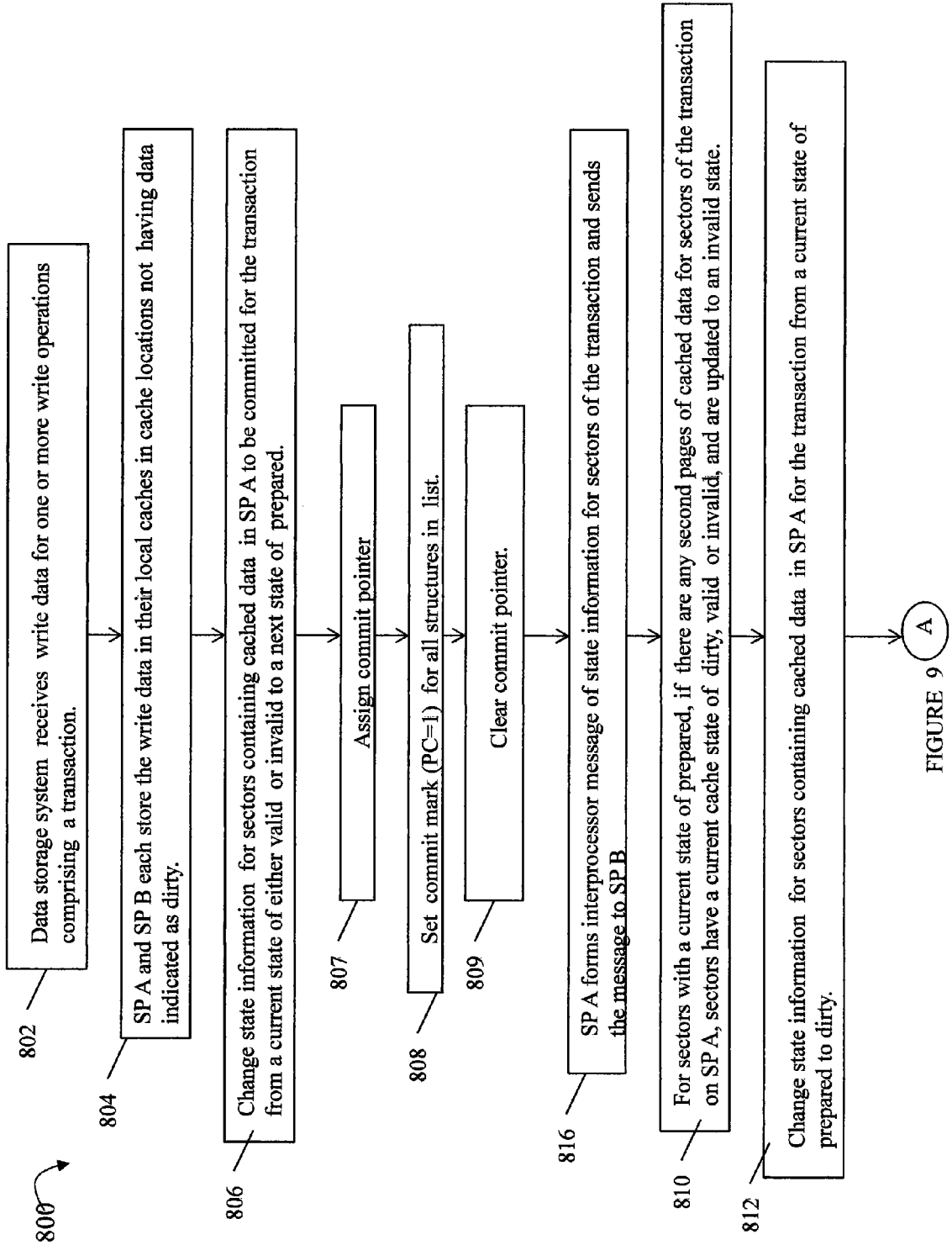
FIGS. 9 and 10 are processing steps of a flowchart that may be performed in an embodiment in accordance with techniques herein.
Figure 10:
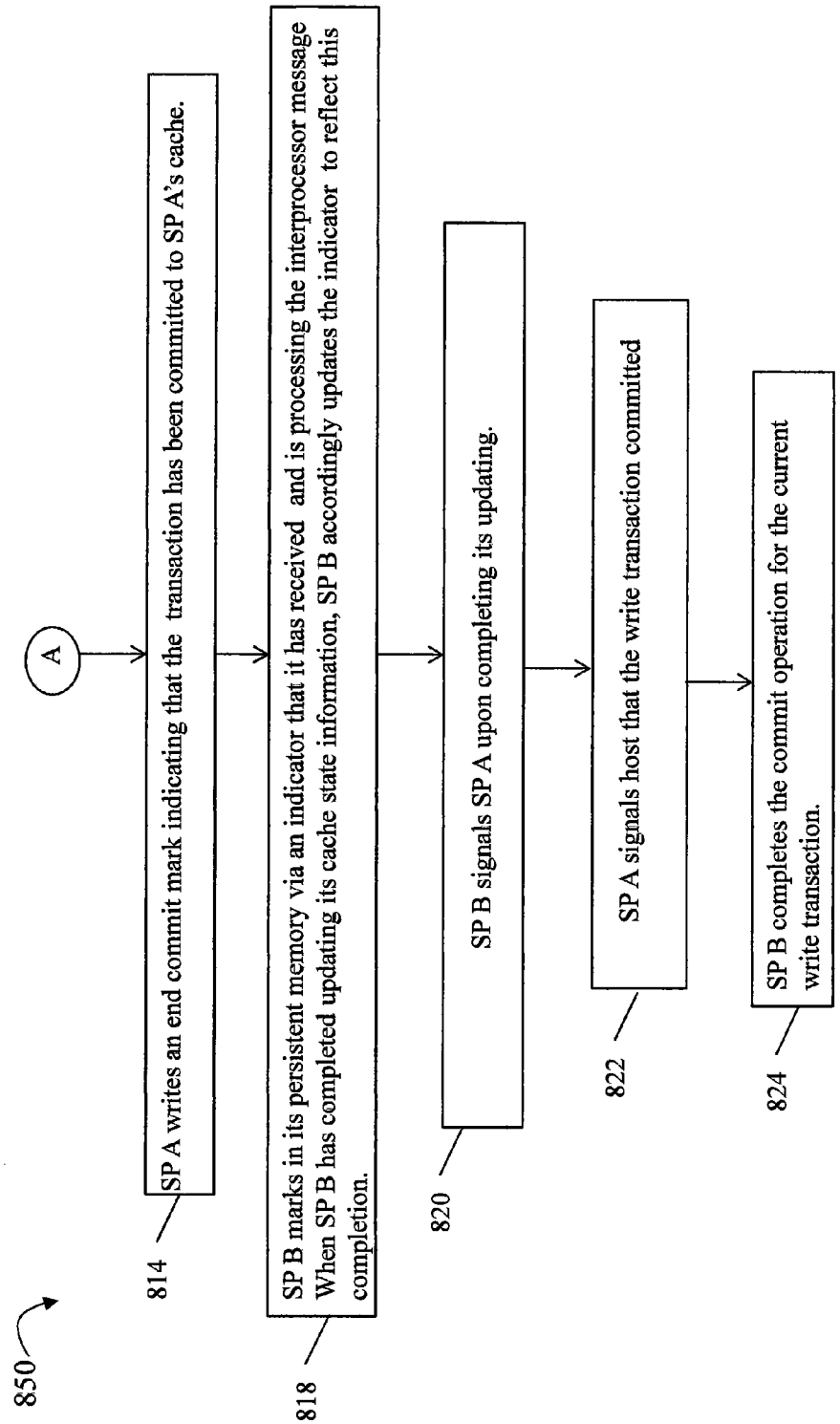

With reference to FIGS. 9 and 10, shown is a flowchart of processing steps as may be performed in an embodiment in accordance with techniques herein. The steps of FIGS. 9 and 10 summarize processing as described above. At step 802, the data storage system receives write data for one or more write operations comprising a single transaction. At step 804, SP A and SP B both receive and both store the write data in their local caches in cache locations not having data indicated as dirty. In this example with step 804, the data storage system may include hardware to simultaneously send to both SP A and SP B the received write data. Alternatively, as described elsewhere herein, SP A may receive the write data and then perform a DMA operation to store the write data from SP A's cache in SP B's cache. In step 806, the state information for sectors containing cached data in SP A to be committed for the transaction is updated from a current state of either valid (V) or invalid (I) to the state of prepared (P). Beginning with step 807, SP A performs processing to denote the start of the commit operation with respect to committing the transactional write data to SP A's cache. With reference to FIG. 7, step 807 may include assigning the commit pointer 504 to the head pointer 502. In step 808, the commit mark (PC=1) for all structures in the list headed by 502 is set. Step 808 may include traversing the list of structures having a first entry denoted by head pointer 502 and setting the pending commit (PC) state indicator in each such structure to 1 (e.g., fields 518 and 538 to 1). Upon setting the foregoing PC indicators of the structures to 1, commit pointer may be set to NULL in step 809. At step 816, SP A forms the interprocessor message of state information for sectors of the transaction and send the message to SP B. At step 818, SP B marks in its persistent memory via an indicator that it has received and is processing the interprocessor message. When SP B has completed updating its cache state information using the received interprocessor message of state information from SP A, SP B accordingly updates the indicator to reflect this completion. At step 810, if there are any second pages of cached data for sectors of the transaction on SP A, such sectors have second pages with a cached data status of dirty (D) or Valid (V) or invalid (I) which are updated to indicate an invalid (I) state. At step 812, the state information for sectors containing cached data in SP A for the transaction is updated from a current state of prepared to a state of dirty (D). At step 814, SP A performs processing to denote writing an end commit mark thereby indicating the end or completion of the commit operation with respect to committing the transactional write data to SP A's cache. With reference to FIG. 7, step 814 may include traversing the list of structures having a first entry denoted by head pointer 502 and setting the pending commit (PC) state indicator in each such structure to 0 (e.g., fields 518 and 538 to 0). After completing step 818, processing proceeds to step 820 in which SP B signals SP A that it has completed updating its cache state information. At step 822, upon SP A receiving the notification from SP B in step 820, SP A subsequently notifies the host that the write transaction is committed. In step 824, SP B completes the commit operation for the current write transaction.

An embodiment may implement the techniques herein using code executed by a processor. For example, an embodiment may implement the techniques herein using code which is executed by a processor of the data storage system, management system, or more generally, any computer system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing caching comprising:
   receiving, at a data storage system, a plurality of write operations comprising a single transaction, the plurality of write operations writing data to one or more storage locations of one or more devices of the data storage system;
   caching write data of the plurality of write operations in one or more cache pages of a first cache of a first storage processor, wherein each of the plurality of write operations writes a portion of the write data to a storage location of a device having data stored in a cache page of the first cache and having state information indicating that the cache page includes invalid data for the storage location of the device prior to performing said each write operation;
   setting state information for the one or more cache pages of the first cache from an invalid state denoting said invalid data to a prepared state thereby indicating that, after performing said caching, the one or more cache pages include data for the one or more storage locations of the one or more devices used in committing the single transaction to the first cache;

storing the write data of the plurality of write operations in a second cache of a second storage processor;

setting a transaction commit state for the single transaction, said transaction commit state indicating that transaction commitment processing for the first cache has commenced and is pending, wherein the first storage processor performs commitment processing of the single transaction to the first cache and the second storage processor performs commitment processing of the single transaction to the second cache, wherein if the first storage processor is reset prior to setting the transaction commit state to pending, the plurality of write operations of the first cache of the first storage processor and the plurality of write operations of the second cache of the second processor are discarded;

setting state information of the one or more cache pages of the first cache from the prepared state to a dirty state for the one or more storage locations of the one or more storage devices thereby indicating that the one or more cache pages include a more recent copy of data than the one or more storage locations of the one or more devices; and setting the transaction commit state for the single transaction to indicate that the transaction commitment processing for the first cache is completed.

2. The method of claim 1, further comprising:

sending, from the first storage processor to the second storage processor, a set of state information for portions of the one or more cache pages associated with storage locations of storage devices written to by the plurality of write operations, wherein said sending is performed prior to said step of setting state information of the one or more cache pages of the first cache from the prepared state to the dirty state.

3. The method of claim 2, wherein each cache page includes a plurality of data portions, each of said plurality of data portions of said each cache page used to cache data for a range of addresses of a storage device.

4. The method of claim 2, wherein the second storage processor sets second storage processor state information indicating it has received and is processing the set of state information associated with the plurality of write operations from the first storage processor.

5. The method of claim 4, wherein the second storage processor updates the second cache to include the set of state information.

6. The method of claim 5, wherein, after completing updating of the second cache to include the set of state information received from the first storage processor, the second storage processor state information is updated to indicate processing of the set of state information is completed.

7. The method of claim 1, wherein at least one of the plurality of write operations writes a portion of the write data to a storage location of a device having data stored in two cache pages of the first cache and, as a result of performing said caching, the write data is stored in a first of the two cache pages having first state information indicating that the first cache page includes invalid data for the storage location of the device prior to performing the plurality of write operations, wherein the second of the two cache pages has second state information indicating that the second cache page includes dirty data for the storage location of the device thereby indicating that, prior to performing said plurality of write operations, the second cache page includes a more recent copy of data than the storage location of the device.

8. The method of claim 7, wherein, prior to setting the transaction commit state to indicate that the transaction commitment processing for the first cache is completed, the method includes:

setting the second state information of the second cache page for said at least one write operation from a dirty state, thereby indicating that the second cache page includes a more recent copy of data than the storage location of the device, to an invalid state, thereby indicating that the second cache page includes invalid data for the storage location of the device.

9. The method of claim 1, wherein at least a first of the plurality of write operations is to a first logical device at a first location and a second of the plurality of write operations is to a second logical device at a second location, the second logical device being different from the first logical device.

10. The method of claim 1, wherein at least a first of the plurality of write operations is to a first logical device in a first logical address range and a second of the plurality of write operations is to the first logical device in a second logical address range, the second logical address range and the first logical address range corresponding to different nonconsecutive logical address ranges of the first logical device.

11. The method of claim 1, wherein the first storage processor and the second storage processor are included in a data storage system and each of the first storage processor and the second storage processor performs write back caching in connection with processing said plurality of write operations.

12. The method of claim 1, wherein the write data of the plurality of write operations is copied from the first storage processor to the second storage processor by performing a direct memory access operation which copies data from first portions of the one or more pages of the first cache having associated state information indicating that the first cache is in the prepared state with respect to the first portions denoting that the first portions include data for the one or more storage locations of the one or more devices used in committing the single transaction to the first cache.

13. A non-transitory computer readable medium comprising code stored thereon for performing caching that, when executed, performs a method comprising:

receiving, at a data storage system, a plurality of write operations comprising a single transaction, the plurality of write operations writing data to one or more storage locations of one or more devices of the data storage system;

caching write data of the plurality of write operations in one or more cache pages of a first cache of a first storage processor, wherein each of the plurality of write operations writes a portion of the write data to a storage location of a device having data stored in a cache page of the first cache and having state information indicating that the cache page includes invalid data for the storage location of the device prior to performing said each write operation;

setting state information for the one or more cache pages of the first cache from an invalid state denoting said invalid data to a prepared state thereby indicating that, after performing said caching, the one or more cache pages include data for the one or more storage locations of the one or more devices used in committing the single transaction to the first cache;

storing the write data of the plurality of write operations in a second cache of a second storage processor;

setting a transaction commit state for the single transaction, said transaction commit state indicating that transaction commitment processing for the first cache has commenced and is pending, wherein the first storage processor performs commitment processing of the single transaction to the first cache and the second storage processor performs commitment processing of the single transaction to the second cache, wherein if the first storage processor is reset prior to setting the transaction commit state to pending, the plurality of write operations of the first cache of the first storage processor and the plurality of write operations of the second cache of the second processor are discarded;

setting state information of the one or more cache pages of the first cache from the prepared state to a dirty state for the one or more storage locations of the one or more storage devices thereby indicating that the one or more cache pages include a more recent copy of data than the one or more storage locations of the one or more devices; and setting the transaction commit state for the single transaction to indicate that the transaction commitment processing for the first cache is completed.

14. The non-transitory computer readable medium of claim 13, further comprising code that, when executed, sends, from the first storage processor to the second storage processor, a set of state information for portions of the one or more cache pages associated with storage locations of storage devices written to by the plurality of write operations, wherein said sending is performed prior to said step of setting state information of the one or more cache pages of the first cache.

15. The non-transitory computer readable medium of claim 14, wherein each cache page includes a plurality of data portions, each of said plurality of data portions of said each cache page used to cache data for a range of addresses of a storage device.

16. The non-transitory computer readable medium of claim 14, wherein the second storage processor sets second storage processor state information indicating it has received and is processing the set of state information associated with the one or more write operations from the first storage processor.

17. The non-transitory computer readable medium of claim 16, wherein the second storage processor updates the second cache to include the set of state information.

18. The non-transitory computer readable medium of claim 17, wherein, after completing updating of the second cache to include the set of state information received from the first storage processor, the second storage processor state information is updated to indicate processing of the set of state information is completed.

19. The non-transitory computer readable medium of claim 13, wherein at least a first of the plurality of write operations is to a first logical device at a first location and a second of the plurality of write operations is to a second logical device at a second location, the second logical device being different from the first logical device.

20. The non-transitory computer readable medium of claim 13, wherein at least a first of the plurality of write operations is to a first logical device in a first logical address range and a second of the plurality of write operations is to the first logical device in a second logical address range, the second logical address range and the first logical address range corresponding to different nonconsecutive logical address ranges of the first logical device.

* * * * *